March 5, 1935.　　　C. W. KEUFFEL ET AL　　　1,993,009
DISTANCE FINDER
Filed July 21, 1933　　　3 Sheets-Sheet 1
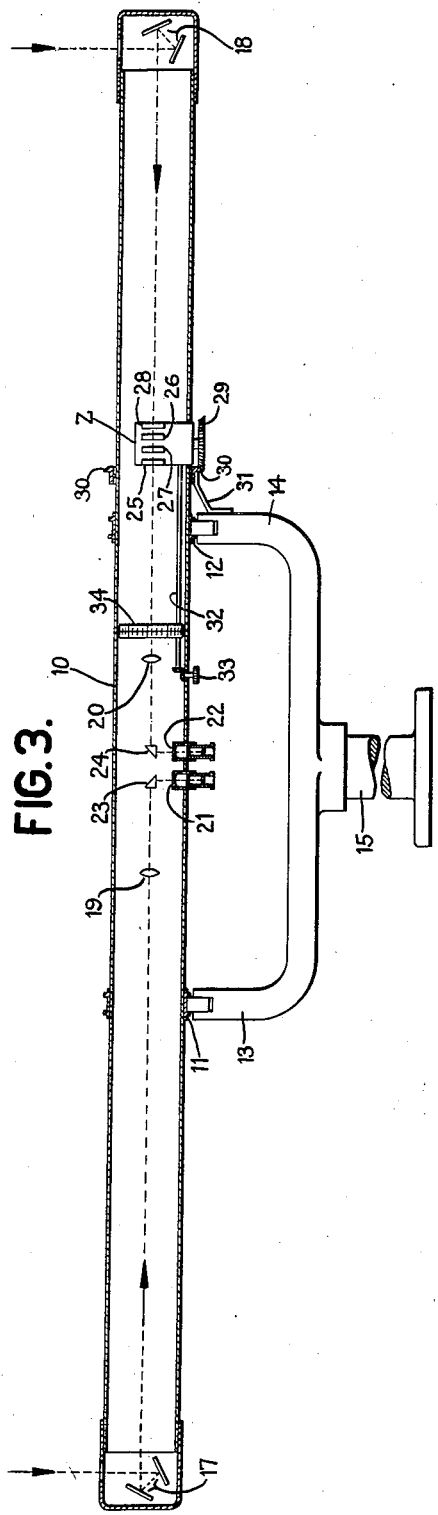
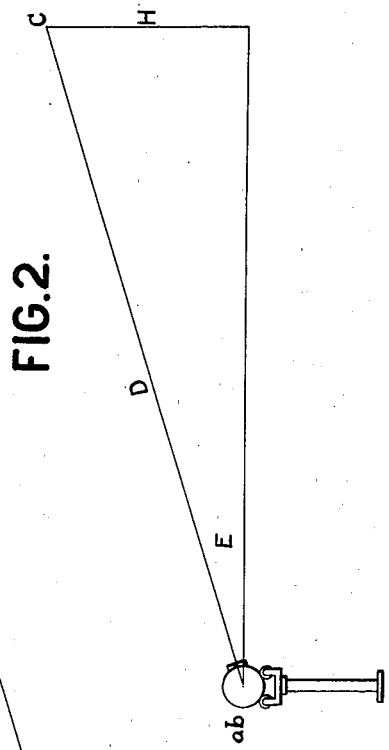
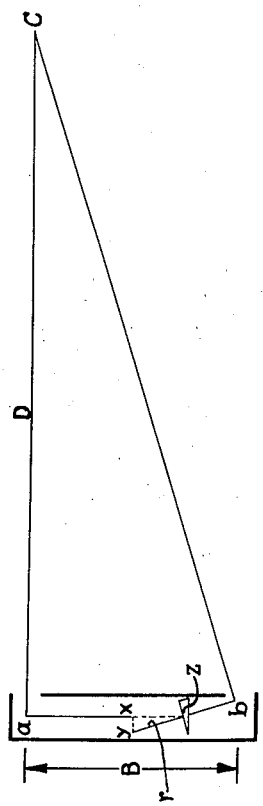
INVENTORS
*CARL W. KEUFFEL*
*BEN. J. CAMPBELL*
BY
Frederick Griswold Jr.
ATTORNEY

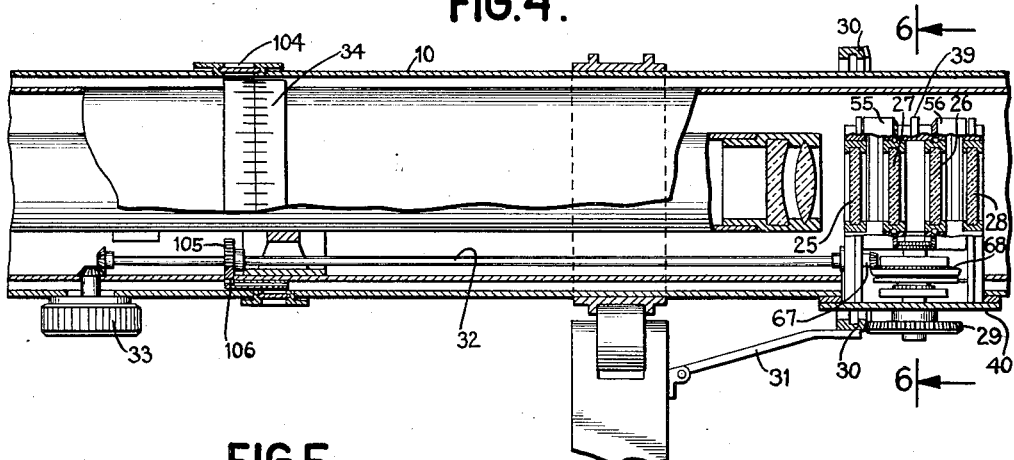
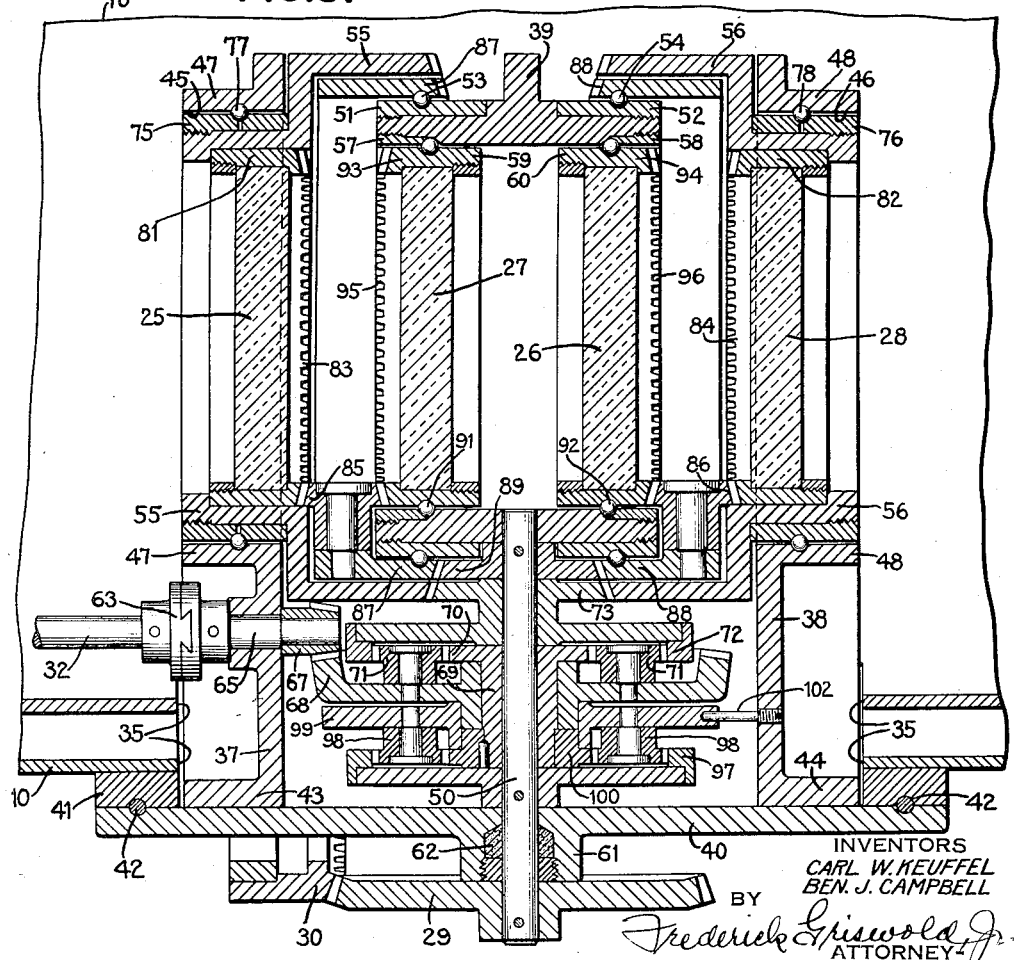

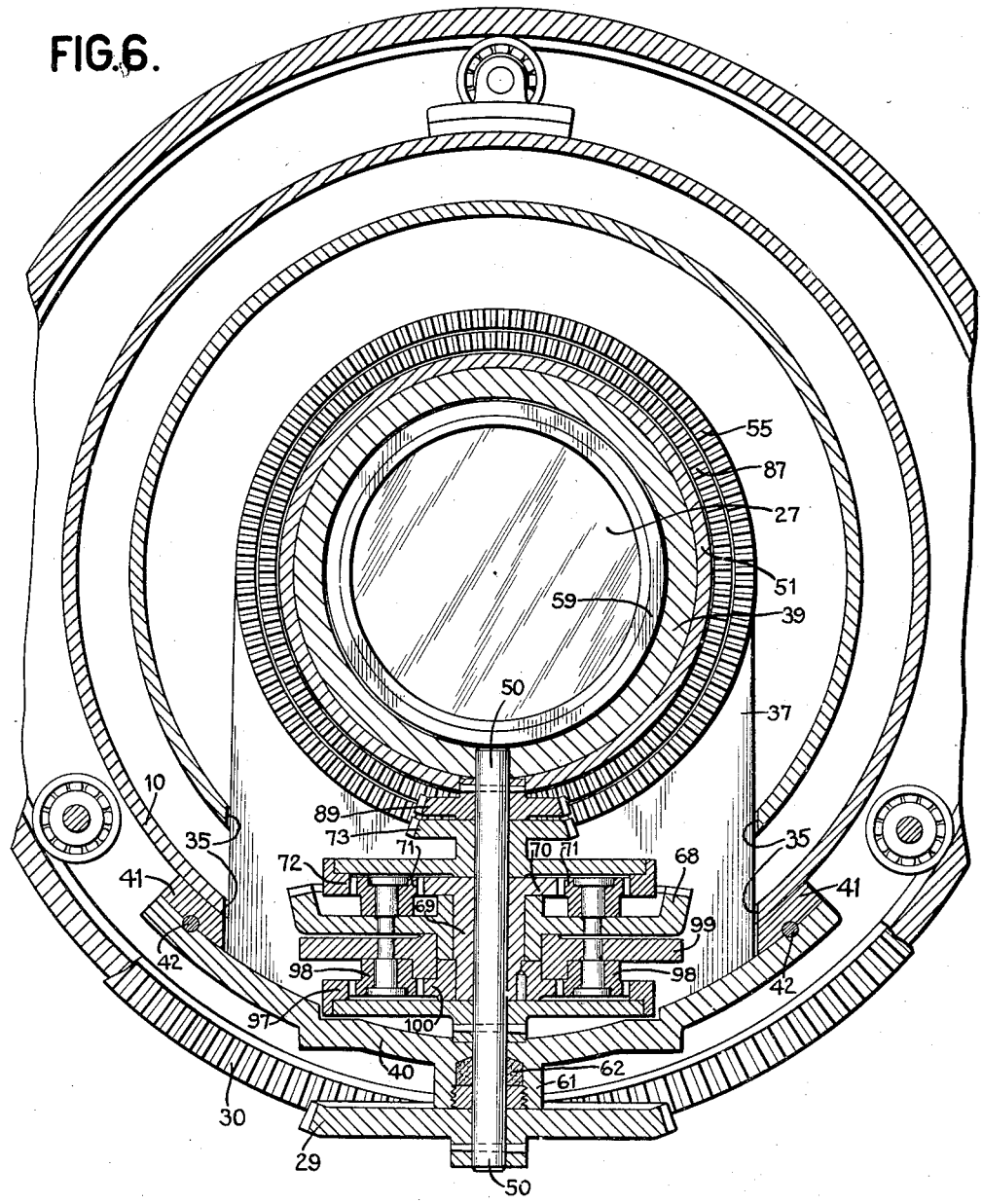

Patented Mar. 5, 1935

1,993,009

UNITED STATES PATENT OFFICE 1,993,009

DISTANCE FINDER

Carl W. Keuffel, Weehawken, and Ben J. Campbell, Hoboken, N. J., assignors to Keuffel & Esser Co., Hoboken, N. J., a corporation of New Jersey Application July 21, 1933, Serial No. 681,410

16 Claims. (Cl. 88—2.7)

This invention relates to instruments adapted to determine distances commonly referred to as telemeters, range finders, height finders or altimeters of the kind in which the height of an object (target) or its slant range is ascertained by reading an indication on a scale, for instance, on the instrument.

Instruments of the character described for measuring height, usually have optic systems providing a deflection of the light rays between the eye piece and the object glasses proportional to a function of the angle of sight of the plane containing the object and the axis of the instrument.

One object of the present invention is to provide instrumentalities for accurately restoring the parallax and accurately adjusting the optic systems with respect to one another in proportion to the angle of sight.

Another object of the invention is to incorporate the optic deflection systems and their means for relative adjustment in a unitary structure which, for convenience, is readily removable so that its accuracy may be tested, and for repair.

It is also an object of the invention to provide a removable structure with which the optic deflection systems are carried which permits the sealing of all joints.

The invention also seeks a device of the character described which is practical from the standpoint of ease and accuracy of manufacture, maintenance and use.

These and other objects of the invention and the means for their attainment will be more apparent from the following detailed description taken in connection with the accompanying drawings illustrating a preferred embodiment thereof, and in which:—

Figure 1 is a diagrammatic view illustrating the principle of operation of the invention;

Figure 2 is a diagrammatic view showing one use to which the invention may be put;

Figure 3 is a view showing the invention applied to a range finder;

Figure 4 is a sectional view, on an enlarged scale, showing details of the structure shown in Figure 3;

Figure 5 is an enlarged view of the optic systems shown in Figure 4, and their means of adjustment; and Figure 6 is a transverse sectional view taken in the plane indicated by the line 6—6 of Figure 4.

Referring first briefly to Figure 3, instruments of this character often comprise a casing or tube 10, rotatably supported about a horizontal axis in bearings 11, 12 on the arms 13 and 14 which may be part of a stand 15. In the tube 10, at each end, are entrance reflectors 17 and 18, which deflect the rays received from a distant object along the horizontal axis to the objectives 19 and 20, which image the object at the focal planes 21 and 22 after reflection by prisms 23 and 24. On one side of the instrument, in parallel rays, between an objective 20 and its entrance prism 18, is placed a deflection prism system indicated generally at Z and composed of four prisms 25, 27, 26 and 28. These four prisms are contained in one assembly referred to herein as the height finding mechanism, which is operatively connected through bevel gears 29 and 30 and connection 31 to the arm 14 and stand 15. Thus a movement of the tube 10 about its horizontal axis will influence or actuate the height finding mechanism. A shaft 32 with knob 33 by which is actuated the scale 34 for reading height is also connected with mechanism Z so that a turn of knob 33 will influence the range or height setting an amount which can be read off on scale 34.

Such an instrument is illustrated diagrammatically in Figure 1 wherein the light rays from a distant object C enter the left hand end of the instrument at the point $a$ and the right hand end at the point $b$. The distance between the points $a$ and $b$ is the distance B and is fixed.

The point C may be considered as at a distance D from the instrument. The point C will be imaged at $x$ through the left hand end of the instrument and at $y$ through the right hand end. Now, if a prism (or prism system) $z$ be inserted in the path of the light ray $by$ to produce a deflection so that the parallax (the distance $xy$) may be made zero, i. e., the ray $Cby$ be made to deflect to $bZx$. Now the angle of deflection $yZx$ is equal to the angle $bca$ and is proportional to $$\frac{B}{D}$$

as will be obvious. By varying the prism system a known measurable amount, the distance D will correspond to a definite deflection angle $yZx$ and can, therefore, be measured.

Let the prism system $z$ be replaced by a system of four prisms (25, 27, 26 and 28) each having an angle of deviation such that it produces a displacement at the focal plane equal to a distance $p$. Now let the prism 25 be rotated through an angle $r$ and prism 27 be rotated through an angle $-r$. The displacement $p'$ provided in the plane of triangulation, by prisms 25 and 27 will be $2p \sin r$. Then $p'=2p \sin r$. The deflection provided by prism system 26 and 28 will also be $2p \sin r$ so that the deflection of prisms 25 and 27 and 26 and 28 together will be $2p' = 4p \sin r$.

Now if the system 25, 27 be bodily rotated as a unit through the angle E and the system 26, 28 be rotated as a unit through the angle $-E$, then the displacement $p'' = 4p \sin r \sin E$.

Since the total displacement in the plane of triangulation is proportional to $$\frac{B}{D}$$

then $$p'' = \frac{B}{D} = 4p \sin r \sin E$$

$$\frac{B}{D \sin E} = 4p \sin r$$

and since H is the height of the target C and in the triangle of Figure 2 is equal to $D \sin E$, then substituting this value in the foregoing equation:

$$\frac{B}{H} = 4p \sin r$$

or $$H = \frac{B}{4p \sin r}$$

B is a constant, so the height H depends only on the angle of rotation $(r)$ of the wedges (prisms) and thus the height may be read off on a scale 34 rotated in synchronism with the means turning the prism systems.

In other similar instruments, the deflection prism or prisms have been placed between the objective and the eyepiece in the converging or diverging rays. In this position, the amount of deflection at the focal plane varies with the distance of the individual wedges from the focal plane, i. e., the deflection is not strictly a function of the strength of the wedges and their relative rotation, but also depends on their distance from the focal plane. Thus a system of four wedges placed in the converging beam will not follow the simple equation $$H = \frac{B}{4p \sin r}$$

However when the deflection prisms are placed in the parallel rays between the objective and the entrance prisms, then the distance between prisms or their position along the optical axis does not affect the resultant deflection of the image at the focal plane.

In the illustrated embodiment, the deflecting prism system of this invention is disposed between one of the objectives and an entrance prism, in the parallel rays. It comprises two optic systems or compensators 25, 27 and 26, 28 rotatable about the axis of the telemeter in equal and opposite directions. Each optic system or compensator comprises two elements or wedges (prisms) 25, 27 and 26, 28, respectively, each rotatable about the axis of the telemeter in equal and opposite directions. As shown in Figures 4, 5 and 6, an opening 35 formed in the wall of the tube 10 receives a composite frame 37, 38, 39, the cylindrically shaped base portion 40 thereof serving as a base or support for the structure as a whole upon which all the parts are assembled and by which it is removably secured to the wall of the tube, for instance, to arcuate base receiving portions 41 permanently fixed on either side of the opening 35. Suitable packing 42 seals the joint to prevent moisture and dust entering the tube.

The spaced plane frame portions 37, 38, having, respectively, an arcuate flange 43, 44 by which the part is mounted on the base 40, are formed, respectively, with cylindrical openings 45, 46, in the axis of the tube for the passage of the light rays, which opening is defined, respectively, by flanges 47, 48 serving as bearings for rotatable parts of the height mechanism.

Cooperating with the parts 37, 38 is a substantially cylindrical intermediate frame or bearing portion 39 in the lower part of which the upper end of the shaft 50 is conveniently journalled. The intermediate frame member 39 is preferably also supported by the base 40. The upper portion of the part 39 is formed with, or otherwise provided, outwardly, with raceways 51, 52 for ball bearings 53, 54 on which annular members 55 and 56 turn in the axis of the tube and similarly on the inside with raceways 57, 58 for ball bearings in which the wedge frames 59 and 60 turn in the axis of the tube 10.

Journalled in a boss 61 centrally of the plate 40, is the radially disposed shaft 50, the boss being also provided with packing 62, as a seal. Fixed on the shaft 50 outwardly of the closure 40 is the bevel pinion 29 meshing with the fixed annular gear 30 carried with, say, the arm 14 of the stand 15, as by a bracket 31. Thus the gear 30 is stationary and as the tube 10 is turned therein, the shaft 50 is rotated. This shaft effects adjustment by imparting some of the necessary motions to the prisms, as will be made clear hereinafter.

Other motions are effected from the range knob 33 which turns the shaft 32 within the tube and which shaft is removably coupled, as at 63, to a stub shaft 65 journalled in one of the annular frame members 37 and having a bevel pinion 67 on its end within the frame.

Bevel pinion 67 is meshed with a bevel gear 68 journalled on a sleeve like hub 69 of a gear 70 freely rotatable on the shaft 50. The gear 68 carries, preferably, three stud gears 71, which in turn mesh with an internal gear 72, also freely rotatable on the shaft. The gear train 68, 71 and 72 may be considered as a planetary differential.

Gear 72 is integral with or secured to a bevel gear 73, which is in mesh with the annular rotatable members 55 and 56 on which, conveniently, are threaded race members 75, 76, respectively, turning on balls 77, 78 and within the flanges 47 and 48 which form the companion ball races.

The rotatable members 55 and 56 carry, fixed thereto, respectively, the annular frames 81 and 82 in which are removably mounted the prisms 25 and 28, respectively. Thus a predetermined movement of the bevel gear 73 will impart predetermined movements in opposite directions of the prisms 25 and 28 about the axis of the telemeter.

The annular frames 81 and 82 are formed inwardly with bevel gear teeth 83 and 84, respectively, which are in mesh, respectively, with bevel pinions 85 and 86 mounted upon annular members 87 and 88, respectively, having internal bevelled gear teeth meshing with a bevel pinion 89 fixed on the shaft 50.

Secured on the outer side of the intermediate bearing member 39 are annular ball races 51 and 52. The annular carriers 87 and 88 for stud pinions 85 and 86 turn on the balls 53 and 54 on the ball races 51 and 52.

The inner surface of the intermediate bearing member 39 also carries ball races 57, 58 for the balls 91, 92 upon which turn, respectively, the frames 93 and 94, removably carrying the respective prisms 27 and 26. These frame members 93 and 94 are formed, respectively, with annular bevel gear teeth 95 and 96 in mesh, respectively, with the stud pinions 85 and 86. In some situations, it may be found desirable to have the intermediate bearing frame member 39 supported solely in position on the coacting geared members.

Now when the axes of stud pinions 85 and 86 are stationary, i. e., when the shaft 50 and bevel gear 89 are not rotating, the movement of the annular member 55 will cause the movement of one pair of elements, i. e., the frames 81 and 93, and the prisms carried thereby, in equal and opposite directions. Similarly, the other pair of elements, i. e., the prisms 26 and 28, are moved in equal and opposite directions by the rotation on a horizontal axis of the annular rotating member 56. All, as understood, from the shaft 32 and its pinion 67 through the planetary differential 68, 71 and 72.

Also necessary, in the adjustment of the mechanism, is the rotation of one optic deflecting system, i. e., the pair of prisms 25 and 27, as a unit through an angle equal and opposite to that through which the other optic deflecting system, i. e., the prisms 26 and 28, is rotated when the tube 10 is revolved about its horizontal axis. Since annular gear 30 is fixed with respect to the support 13—15, movement of the tube about its axis will cause the rotation of gear 29 and with it the shaft 50.

To the shaft 50 is pinned an internal gear 97 meshing with stud pinions 98 rotatably mounted on a stationary carrier 99, the bearing of which is conveniently the hub of a gear 100 and the hub of the bevel gear 68, the hub of gear 68 rotating on the sleeve like hub 69.

The stationary carrier 99 is fixed to the frame, say, 38, conveniently by a pin 102, so that the axes of stud pinions 98 are relatively fixed in position. The gear 97, stud pinions 98 and gear 100 may also be considered a planetary differential.

Now gears 70 and 100 are secured together to turn as a unit so that when the stud carrying gear 68 is held against movement by means of the pinion 67, then the motion of internal gear 70 will produce an equal motion of internal gear 72 and the equal movement of gear 73 fixed thereto will cause movement of the carrier members 87 and 88, in opposite directions. In this situation, however, gear 89 also pinned on shaft 50, is rotating synchronously with gear 73 which results in the rotation of the annular stud pinion carriers 87 and 88, thereby causing prism frame 81 to move with its companion prism frame 93 in the same direction and at the same speed, and similarly prism frame 94 to move with its companion prism frame 82 in the same direction and at the same speed but the direction of the two optic systems 81, 93 and 94, 82 will be in directions opposite to each other. In other words, a movement of gear 29 will actuate internal gears 97 and 72 in the same direction and through equal angles and thus bevel gears 73 and 89 will move in the same direction and through equal angles. This will carry the prism pair 25, 27 in one direction as a unit (without relative movement between prisms 25 and 27) and, similarly, the prism pair 26, 28 in the opposite direction as a unit and through an angle proportional to that through which the tube 10 has been turned.

A scale 34 (Figure 4) by which the desired distance may be directly read is rotatably mounted within the tube 10 and visible through a window 104. The scale is moved proportionately to the relative movement of the prisms of each pair by a gear 105 on the actuating shaft 32 which meshes with an internal gear 106 on the scale.

Thus, the movements of the respective optic systems and their component elements in the manner described will permit a direct reading of the height (H) of an object C above the horizontal as explained at the beginning of this description. Moreover, if the member 31 is disconnected and the annular gear 30 and pinion 29 are locked together by any suitable means, the distance (D) to the object C may be read directly from the scale as will be understood.

It will thus be seen that, in an altimeter having two objectives, optical means, i. e., the wedges of the height mechanism, is interposed in the path of parallel rays to the one and adjacent objective, that is, between the objective and its corresponding end reflector, and means is provided to adjust the optical means to move the image produced by the adjacent objective relative to the stationary image produced by the remote objective. The path of relative movement of the image thus produced is a straight line, the image always remaining in the field of the eyepiece.

A unitary structure supporting and incorporating the optic systems is thus provided which is readily removable and insertable for adjustment, testing and repair. The structure can be assembled with the utmost accuracy since the component parts supplement one another and serve as bearings for each other. When the height mechanism and its actuating means are in place the telemeter is completely sealed against the admission of dust and moisture.

Various modifications will occur to those skilled in the art in the disposition and configuration of the component elements as well as in the substitution of parts performing the same functions and no limitation is intended by the phraseology of the foregoing description or illustrations in the accompanying drawings.

What is claimed is:—

1. In a device of the character described having two optic deflection systems each comprised of two elements, a tubular casing formed with an aperture, a closure base member therefor, spaced members carried thereby, each formed with a cylindrical opening, an intermediate frame member formed with a cylindrical opening and carried with said members, said cylindrical openings providing annular bearings within which the respective elements rotate.

2. In a device of the character described having two optic deflection systems, each comprised of two elements, a tubular casing formed with an aperature, a closure base member therefor, spaced members carried thereby, each formed with a cylindrical opening, an intermediate frame member formed with a cylindrical opening and carried with said members, said cylindrical openings providing annular bearings within which the respective elements rotate and annular bearings within which the respective systems rotate.

3. In a device of the character described having two optic deflection systems, each comprised of two elements, a tubular casing formed with an aperture, a closure base member therefor, spaced members carried thereby, each formed with a cylindrical opening, an intermediate frame member formed with a cylindrical opening and carried with said members, said cylindrical openings providing annular bearings within which the respective elements rotate and annular bearings within which the respective systems rotate and an operating shaft journalled in the closure.

4. In a device of the character described having two optic deflection systems, each comprised of two elements, a pinion, a shaft, a gear fixed on the shaft, a fixed stud pinion carrier whereof the pinions mesh with the gear, a second stud pinion carrier, means to rotate said second carrier from the pinion, a gear having teeth meshing with pinions of both carriers, a third pair of stud pinion carriers, driving connections between the pinions of the third carriers and the elements of the optic systems, respectively, gear means rotatable around the optic axis and fixed to one element of each optic system and a gear having teeth meshing with the pinions of the second carried and with said last named gear means.

5. In a device of the character described having two optic deflection systems each comprised of two elements, a pinion, a shaft, a gear fixed on the shaft, a fixed stud pinion carrier concentric with the shaft, whereof the pinions mesh with the gear, a second stud pinion carrier freely rotatable on the shaft, means to rotate said second carrier from the pinion, a gear having two series of teeth meshing, respectively, with the pinions of both carriers, a third pair of stud pinion carriers rotatable around the optic axis and formed with teeth, frames rotatable around the optic axis in which the respective elements of the optic systems are disposed, said frames being formed with teeth meshing with pinions of the third carriers for rotation in opposite directions through the same angle, gear means rotatable around the optic axis and fixed to one element of each optic system, a gear having two series of teeth meshing, respectively, with the pinions of the second carrier and with said last named gear means.

6. In a device of the character described having two optic deflection systems each comprised of two elements, a pinion, a shaft, a gear fixed on the shaft, a fixed stud pinion carrier concentric with the shaft whereof the pinions mesh with the gear, a second stud pinion carrier freely rotatable on the shaft, said second carrier being formed with teeth meshing with the pinion, a gear having two series of teeth meshing, respectively, with the pinions of both carriers, a third pair of stud pinion carriers rotatable around the optic axis and formed with teeth, frames rotatable around the optic axis in which the respective elements of the optic systems are disposed, said frames being formed with teeth meshing with pinions of the third carriers for rotation in opposite directions through the same angle, gear means rotatable around the optic axis and fixed to one element of each optic system, and a gear having two series of teeth meshing, respectively, with the pinions of the second carrier and with said last named gear means.

7. In a device of the character described having two optic deflection systems each comprised of two elements, a pinion, a shaft, a gear fixed on the shaft, a fixed stud pinion carrier whereof the pinions mesh with the gear, a planetary differential driven from the pinion, one element of which is formed with teeth in mesh with said pinion, a second rotatable pinion carrier, driving connections between the pinions of the third carriers and the elements of the optic systems, respectively, gear means rotatable around the optic axis and fixed to one element of each optic system and another element of said differential having teeth meshing with said last named gear means.

8. In a device of the character described having two optic deflection systems each comprised of two elements, a pinion, a shaft, a gear fixed on the shaft, a fixed stud pinion carrier whereof the pinions mesh with the gear, a planetary differential driven from the pinions, one element of which is formed with teeth in mesh with said pinions, a second rotatable pinion carrier, driving connections between the pinions of the second carrier and the elements of the optic deflection systems, respectively, means rotatable around the optic axis and fixed to one element of each optic system and operative driving connections between another element of the differential and said rotatable means.

9. In a device of the character described having two optic deflection systems each comprised of two elements, a closure base member, spaced members carried thereby, each formed with a circular opening defined by an annular flange, an intermediate annular frame member carried by said base member, said annular members being formed with annular bearings, annular bearings between which the respective systems rotate, an operating shaft journalled in the closure and in the intermediate frame member, a pinion, a gear fixed on the shaft, a stud pinion carrier fixed with respect to the base member whereof the pinions mesh with the gear, a planetary differential driven from the pinion one element of which is formed with teeth in mesh with said pinions, a second rotatable pinion carrier, a third pair of stud pinion carriers rotatable around the optic axis in bearings of the intermediate member, driving connections between the pinions of the third carriers and the elements of the optic systems, respectively, gear means journalled in the annular flange to rotate around the optic axis and fixed to one element of each optic system and formed with teeth, frames rotatable around the optic axis in which the respective elements of the optic systems are disposed, said frames being formed with teeth meshing with pinions of the third carriers for rotation in opposite directions through the same angle, one frame of each system being rotatable in bearings of the intermediate frame members and a gear having teeth meshing with the pinions of the second carrier and with said last named gear means.

10. A telemeter comprising two compensators disposed in the parallel rays outside of the objective on one side thereof, each comprised of two wedges, two interconnected planetary differentials, means to actuate one differential in proportion to a function of height or range, driving connections between one element of said differential and one wedge of each compensator rotating the wedges of each compensator through equal and opposite angles, means to actuate the other differential in proportion to the angle of elevation and driving connections between one element of the last named differential and the respective compensators rotating the compensators through equal and opposite angles.

11. A telemeter comprising two compensators rotatable about the axis and disposed in the parallel rays outside of the objective on one side thereof, each compensator being comprised of two wedges relatively rotatable about the axis, operative connections between said wedges rotating one wedge in one direction when the other wedge is rotated in the opposite direction, two interconnected planetary differentials, means to actuate a first differential in proportion to a function of height or range, driving connections between one element of said first differential and one wedge of each compensator rotating the wedges of each compensator through equal and opposite angles, means to actuate a second differential in proportion to the angle of elevation, driving connections between one element of the second differential and each compensator and driving connections operative with respect to the first differential and a wedge of each compensator whereby the respective compensators are rotated through equal and opposite angles.

12. A telemeter comprising two compensators disposed in the parallel rays outside of the objective on one side thereof, each comprised of two wedges, two interconnected differentials, means to actuate one differential in proportion to a function of height or range, driving connections between one element of said differential and one wedge of each compensator rotating the wedges of each compensator through equal and opposite angles, means to actuate the other differential in proportion to the angle of elevation and driving connections between one element of the last named differential and the respective compensators rotating the compensators through equal and opposite angles.

13. A telemeter comprising two compensators rotatable about the axis and disposed in the parallel rays outside of the objective on one side thereof, each compensator being comprised of two wedges relatively rotatable about the axis, operative connections between said wedges rotating one wedge in one direction when the other wedge is rotated in the opposite direction, two interconnected differentials, means to actuate a first differential in proportion to a function of height or range, driving connections between one element of said first differential and one wedge of each compensator rotating the wedges of each compensator through equal and opposite angles, means to actuate a second differential in proportion to the angle of elevation, driving connections between one element of the second differential and each compensator and driving connections operative with respect to the first differential and a wedge of each compensator whereby the respective compensators are rotated through equal and opposite angles.

14. In an altimeter, the combination with a tubular casing formed with an opening, two objectives, a closure for said opening, a unitary compensator carried with said closure and comprising optical ray deviating means interposed in the parallel rays to one objective and means to adjust said optical ray deviating means to move the image produced by the adjacent objective relative to the stationary image produced by the remote objective.

15. In an altimeter, the combination with a tubular casing formed with an opening, two oppositely disposed telescopic systems each of which includes objectives and two end reflectors for said opening, a unitary compensator carried with said closure and comprising optical light deviating means interposed between the objective of one of the telescopic systems and the adjacent end reflector whereby the image formed by this objective is displaced relatively to the image formed by the objective of the other telescopic system, said light deviating means comprising four optical elements arranged in pairs, means to so actuate each element of said pair that the image displacement is a measurable function of the distance to the target and independent automatic means to so relatively actuate each pair of elements that the image displacement is a measurable function of the height of the target.

16. In a device of the character described having two optic deflection systems, each comprised of two elements, a tubular casing formed with an aperture, a closure base member therefor, spaced members carried thereby, each formed with a cylindrical opening, an intermediate frame member formed with a cylindrical opening and carried with said members, said cylindrical openings providing annular bearings within which the respective elements rotate, and annular bearings within which the respective systems rotate, an operating shaft journalled in the closure and in the intermediate frame member, driving connections between the shaft and the respective systems simultaneously rotating said systems in opposite directions and through equal angles, a pinion and driving connections between the pinion and the elements of each system simultaneously rotating each two elements in opposite directions through equal angles.

CARL W. KEUFFEL.
BEN J. CAMPBELL.